United States Patent [19]

Griffin et al.

[11] Patent Number: 4,877,108
[45] Date of Patent: Oct. 31, 1989

[54] HYDRAULIC LADDER BRACE

[76] Inventors: Lamar H. Griffin, 3737 Northview La., Dallas, Tex. 75229; Paul Hutchins, 15707 Wingale, Houston, Tex. 77082

[21] Appl. No.: 255,389

[22] Filed: Oct. 11, 1988

[51] Int. Cl.[4] .............................................. E06C 5/06
[52] U.S. Cl. ............................................ 182/68; 182/127
[58] Field of Search ..................... 182/127, 68, 69, 97

[56] References Cited

U.S. PATENT DOCUMENTS

| | | | |
|---|---|---|---|
| 597,369 | 1/1898 | Andrews | 182/68 |
| 2,116,470 | 5/1938 | Kiley | 182/127 |
| 2,245,481 | 6/1941 | Kiley | 182/127 |
| 2,586,531 | 2/1952 | Gordon | 182/68 |
| 3,043,398 | 7/1962 | Bakula . | |
| 3,804,207 | 4/1974 | Stonebraker | 182/68 |

*Primary Examiner*—Reinaldo P. Machado
*Attorney, Agent, or Firm*—Vinson & Elkins

[57] ABSTRACT

A hydraulically operated ladder brace designed for transporting, for deploying and for supporting a standard, mobile extension ladder and intended to be pivotally attached to a rack system mounted on the rear portion of a vehicle. The ladder brace consists of a U-shaped frame comprising two elongated members and a cross piece operatively connected with a hydraulic ram and cylinder device. In its transport position, the ladder brace is positioned with the U-shaped frame lying substantially in a horizontal plane and pivotally attached to the rack system. The ladder brace is designed such that a standard extension ladder, such as an aluminum ladder having open ended hollow rungs, may be positioned in parallel relationship with and between both of the elongated members. The ladder brace is further designed to allow depolyment from the transport position through activation of a hydraulic pump which causes a ram to extend outwardly from a hydraulic cylinder thus causing the U-shaped frame to pivot the ladder from a horizontal position through an arc into a position of deployment.

10 Claims, 2 Drawing Sheets

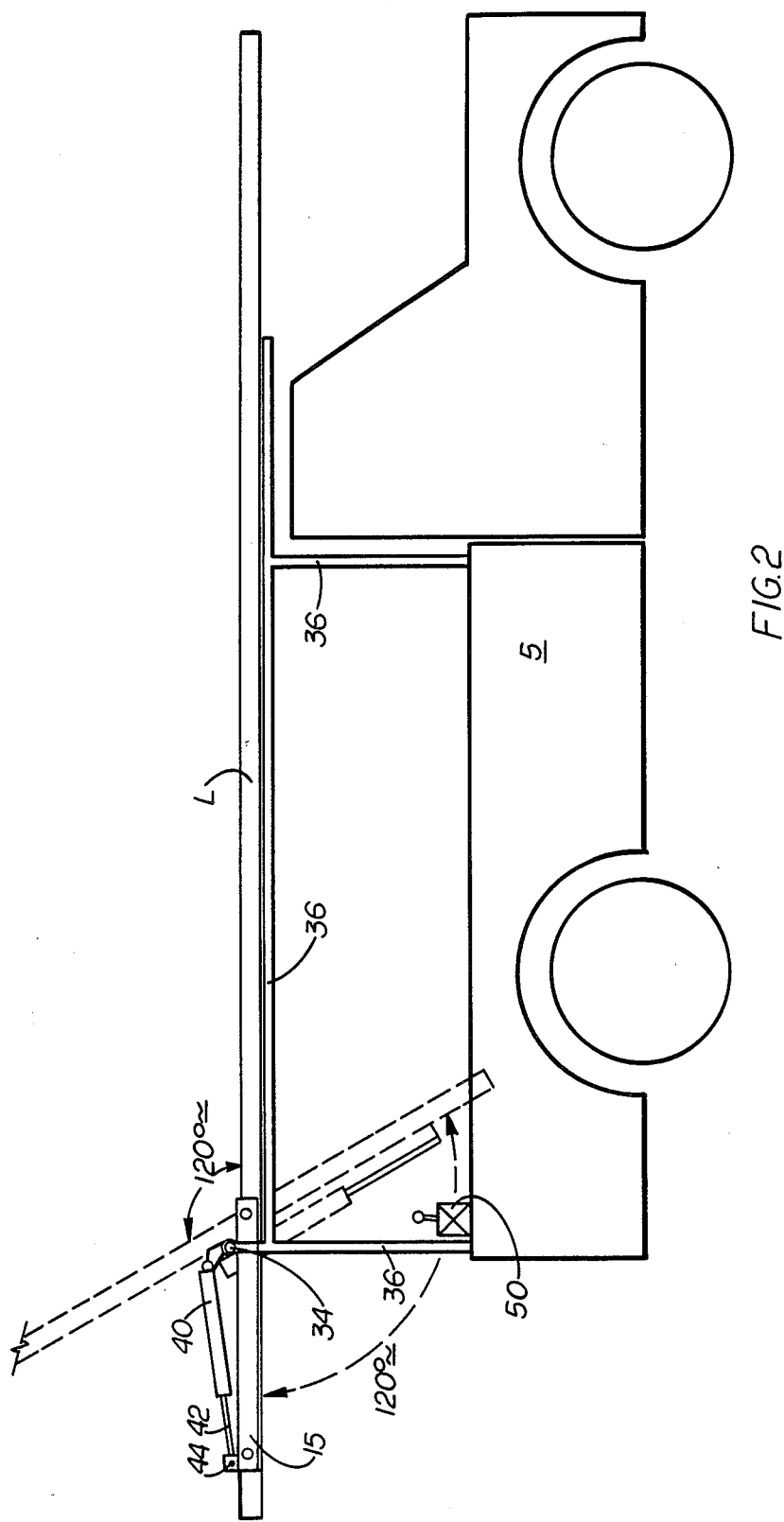

HYDRAULIC LADDER BRACE

FIELD OF THE INVENTION

This invention relates to support braces used in conjunction with mobile extension ladders, and, specifically, this invention relates to a hydraulically deployable ladder brace which accommodates a standard, mobile extension ladder and which is capable of being mounted upon a raised mobile platform or upon the rear portion of a motorized vehicle, such as a pick-up truck. The ladder brace is intended to be mounted upon a rack system or appropriate cross piece carried by the vehicle and to pivot from a transport position to a deployed position.

BACKGROUND OF THE INVENTION

Extension ladders have been utilized for decades in industries such as advertising, repair and construction, to allow workers access to certain work areas located at various heights. The traditional method used to deploy an extension ladder entails manually removing the extension ladder from a vehicle, carrying the ladder to the site at which the work is to be performed, and manually positioning the ladder against a portion of the structure followed by raising the ladder to the appropriate height. In fact, this procedure is still practiced when a service vehicle is not easily driven to the specific job site. Over time, however, as more service vehicles have been placed in service and more service calls have been required to be undertaken by each work crew, the need has arisen for provision of a ladder assembly comprising a brace which allows easy and rapid positioning of the mobile extension ladder without undue manipulation of the ladder by the work crew, and without the requirement of two or more workers to deploy the extension ladder. One such ladder assembly is disclosed in U.S. Pat. No. 3,043,398, issued July 10, 1962, to Bakula.

Bakula discloses a mobile extension ladder adapted to be mounted on a vehicle or similar mobile platform which ladder readily can be shifted from a transport position to an operative position, which is partially self-erecting, and which, when deployed, is supported entirely by the vehicle such that the ladder extends upwardly and forwardly so as to be positioned over a rear portion of the vehicle. This ladder assembly, however, is deficient since the extension ladder can be deployed in only one position in which it is extended upwardly, forwardly and over a portion of the vehicle.

SUMMARY OF THE INVENTION

The ladder brace of the present invention relates to an extension ladder transport and deployment means comprising a hydraulic cylinder and ram operatively connected with a rigid, stationary support structure which structure is secured to a rear portion of a rack mounted, for example, on a vehicle such as a pick-up truck. This ladder brace allows deployment of the ladder in a number of positions including a position in which the ladder extends upwardly, rearwardly and away from the rear of the vehicle.

Specifically, the hydraulic ladder brace of the present invention comprises a sturdy frame including two elongated structural members, each member having a distal end and a proximal end, arranged substantially in parallel relationship one to the other and connected one to the other by at least one cross piece positioned at the distal end of each elongated member to form substantially a U-shaped structure. Two sleeves, or bushings, are positioned intermediately of the distal and proximal ends but near the proximal end such that the longitudinal axis of one is co-axially aligned with the longitudinal axis of the other. The sleeves function as a pivot means and are associated with an elongated member which is a part of a separate rack carried by the vehicle. The frame further comprises at least one hydraulic cylinder and ram positioned in parallel with the two elongated structural members, and connected at its first end to the first cross member and at its second end to a portion of the cross member forming a part of the separate rack. In addition, securement devices, such as rods, are utilized to secure the ladder in position within the ladder brace frame. The rods are inserted within apertures borne at selected points on each elongated structural member and aligned with apertures borne on the ladder.

In its transport position, the ladder brace is pivotally attached to the rear portion of a separate rack carried by a pick-up truck, with elongated structural members extending horizontally along the length of the body or chassis of the truck. A standard extension ladder, such as an aluminum ladder having open-ended, hollow rungs, is positioned substantially in parallel relationship with both of the elongated structural members and is supported by both of the structural members. The ladder may be further supported at its upper or forward end by a portion of the rack system.

From the transport position, the extension ladder is deployed by activating an hydraulic fluid pump which causes the rod to extend from the cylinder and, thus, to pivot the brace, as well as the ladder, from a horizontal position through an arc, for example, an arc of approximately 120°, to the appropriate position of deployment. The ladder is thus positioned adjacent but not necessarily against a stationary structure. Thereafter, additional sections of the ladder may be raised such that the distal end of the ladder is properly positioned.

The primary object of this invention is to provide a means for deploying a mobile extension ladder which means can be shifted easily from a transport position to a deployed position.

Another object of this invention is to provide a ladder brace which is pivotally connected to a vehicle, which is supported by the vehicle, and which is deployed by a hydraulic ram and cylinder device.

Another object of this invention is to provide a ladder brace which is operatively connected with a rear portion of a vehicle, and which may be deployed such that the distal, extended end of the ladder may be positioned in many positions including a position in which the ladder extends upwardly, rearwardly and away from the rear of the vehicle.

These general objects, as well as the specific objectives of the invention, will be understood by reference to the description taken in conjunction with the attached drawings.

DESCRIPTION OF THE DRAWINGS

FIG. 2 is a side view of a vehicle bearing the ladder brace and showing the ladder and the ladder brace both in their transport position and in phantom in their

DETAILED DESCRIPTION OF THE INVENTION

Figure 1:
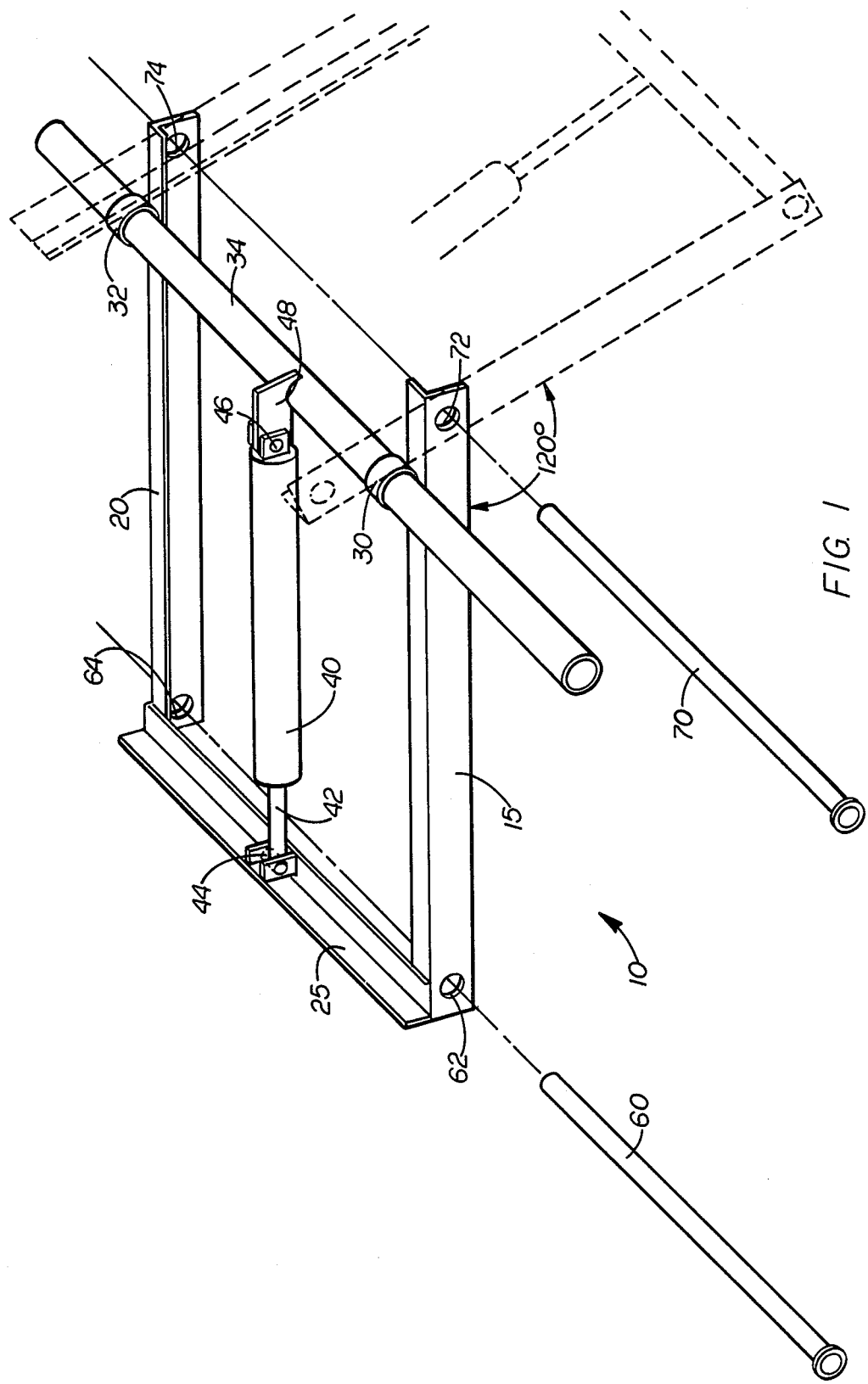
FIG. 1 is a perspective view of the ladder brace of the present invention showing the ladder securement pins and showing in phantom line the ladder brace is its deployed position with ram extended.

The ladder brace of the present invention, designated 10 in FIGS. 1 and 2, is intended to be pivotally attached to the rear portion of a vehicle 5. The ladder brace 10 includes a rigid frame comprising a first elongated structural member 15 and a second elongated structural member 20 arranged in parallel relationship one with the other. A cross piece 25 connects first member 15 with second member 20, and is joined to each preferably at a distal end portion of each. A pivot means is positioned intermediately of the distal end and the proximal end of each. In one embodiment, the pivot means comprises two sleeves 30 and 32 each fixedly secured to elongated members 15 and 20, respectively, near the proximal ends thereof as shown in FIG. 1. Horizontal member 34 is positioned within sleeves 30 and 32 so as to allow sleeves 30 and 32 and thus frame 10, to rotate about horizontal member 34. In one embodiment, horizontal member 34 is a portion of separate rack 36. In a second embodiment, horizontal member 34 is a separate pivot means positioned within bushings 30 and 32 and is separate from but adapted for attachment to a separate rack 36 carried, for example, on the rear portion of a pick-up truck.

The ladder brace 10 further comprises a hydraulic positioning device comprising a cylinder 40 and a ram 42 positioned in parallel with structural members 15 and 20, and pivotally connected at its first end 44 to cross member 25 and pivotally connected at its second end 46 to a horizontal member 34 by a stationary tab portion 48. The hydraulic cylinder is operatively connected to a conveniently positioned hydraulic pump 50. As pump 50 is activated, ram 42 extends outwardly causing a major portion of the ladder brace to pivot from a horizontal transport position, downwardly and forwardly through an arc, for example, of approximately 120°, to a position of deployment. The ladder, in turn, simultaneously moves from a horizontal position to a deployed position, for example, with its upper portion extending upwardly, rearwardly and away from the vehicle. When the ladder brace is used, an extension ladder, for example, having hollow, open-ended rungs is positioned between the first elongated structural member 15 and the second elongated structural member 20, for example, with a selected pair of rungs positioned to receive securement means, such as a first rod 60 and a second rod 70 as shown in FIG. 1. In this preferred example, one of the chosen rungs is aligned with a first aperture 62 in first member 15 and with a second aperture 64 and second member 20, and a second of the chosen rungs is aligned with a third aperture 72 and first member 15 and with a fourth aperture 74 and second member 20. The longitudinal axis of each hollow rung is co-axially aligned with the longitudinal axis of each of the respective apertures, and a rod is inserted through one of the apertures, through the hollow rung and through the other of the apertures, and secured by a fastener placed, for example, in a transverse bore carried at the end of the rod. Each of the rods 60 and 70 have, for example, a distended head portion at one end which acts as one securement means to prohibit translational movement in one direction, and a transverse bore at the other end which receives a fastener, which fastener acts as a securement means to prohibit translational movement in the other direction. One such fastener is a cotter pin. Another such fastener is a padlock which padlock functions as a simple, effective and inexpensive fastener as well as a theft prevention device. Also, it is contemplated that the ladder may be a wooden ladder with appropriate apertures drilled in the sides of the ladder in order to accommodate a securement means.

The mobile ladder brace of this invention allows for easy transportation of an extension ladder and provides for easy shifting of the extension ladder from the transport position to the deployed position. In addition, deployment does not require extensive manual labor, but, rather, is the result of hydraulic pressure supplied by a pump means. With these objectives in mind, the invention has been set forth in the aforementioned features of form, construction, arrangement and combination of parts

We claim:

1. A hydraulically operated ladder brace for transporting, for deploying and for supporting a standard, mobile extension ladder which ladder brace is pivotally attachable to a separate member carried at the rear of the vehicle, said ladder brace comprising:
    two elongated structural members, each member having a distal end and a proximal end, said structural members being arranged substantially in parallel relationship one with the other and connected one to the other by at least one cross piece;
    pivot means attached to each of said elongated structural members;
    a hydraulically operated ram and cylinder device having one end pivotally connected to said cross piece and an opposite end capable of being connected with said separate member associated with a rack mounted on the rear portion of a vehicle; and
    fastening means positioned to secure said mobile extension ladder in parallel relationship with said two elongated structural members.

2. The ladder brace of claim 1 wherein said two elongated structural members and said cross piece form a substantially U-shaped frame.

3. The ladder brace of claim 1 wherein said opposite end of said ram and cylinder device is pivotally connected to a tab portion capable of being fixedly secured to said separate member.

4. The ladder brace of claim 1 wherein said hydraulically operated ram and cylinder device is positioned substantially in parallel relationship with said two elongated structural members.

5. The ladder brace of claim 1 wherein said pivot means comprises two separate annular members, a first of said annular members fixedly secured to each of said elongated structural members and a second of said annular members fixedly secured to the other of said elongated structural members, each of said annular members capable of receiving a bar, with a longitudinal axis of each of said annular members arranged substantially perpendicularly with each of said elongated structural members, and with said longitudinal axis of each of said annular members coaxially aligned one with the other.

6. The ladder brace of claim 5 wherein said stationary member comprises an elongate bar positioned for pivotal movement within each of said annular members, and extending outwardly in opposite directions from each of said annular members.

7. The ladder brace of claim 6 wherein said bar further comprises a tab portion to which said opposite end of said ram and cylinder device is pivotally connected.

8. The ladder brace of claim 1 wherein said fastening means comprises at least one rod having a first securement means at a first end of said rod and a second securement means at a second end of said rod, and further comprising a receiving aperture carried on each of said two elongated supporting members for receiving a portion of said rod.

9. The ladder brace of claim 8 wherein said first securement means includes a distended head portion, and said second securement means includes both a transversely positioned bore and a locking means for insertion into and for securement within said bore.

10. The ladder brace of claim 9 wherein said fastening means includes two of said rods positioned substantially in parallel relationship one with the other.

* * * * *